March 9, 1926.
R. B. FAGEOL
BUMPER
Filed May 31, 1923
1,576,043
2 Sheets-Sheet 1
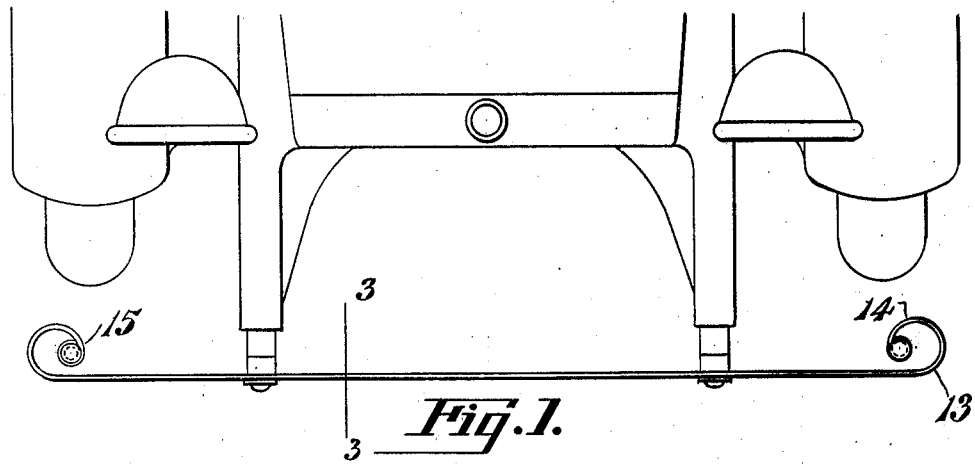
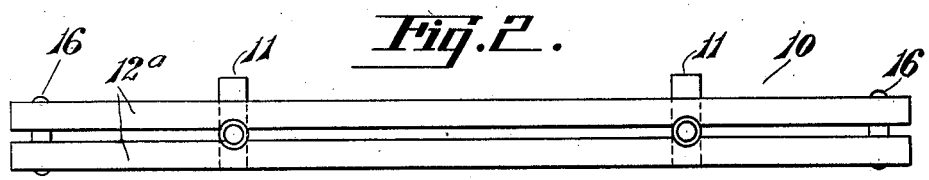
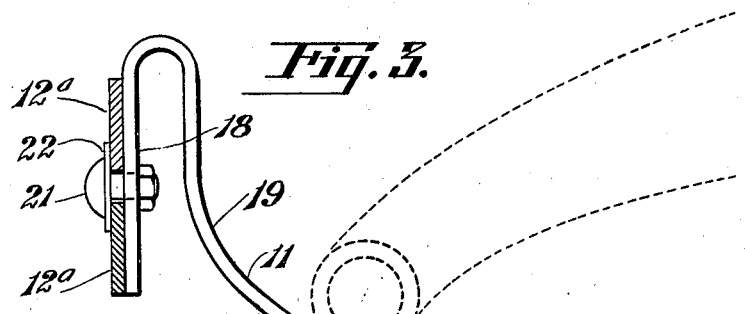
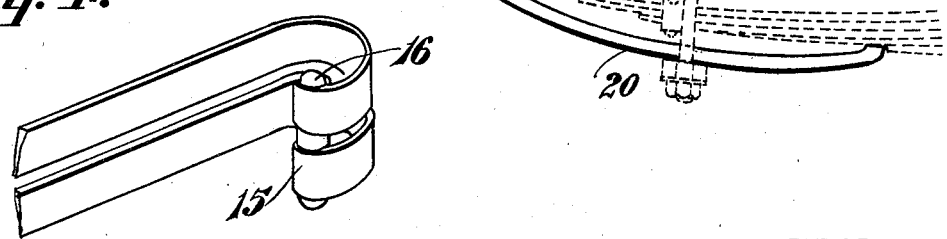
INVENTOR.
ROLLIE B FAGEOL.
BY Dewey, Strong
Townsend & Loftus.
ATTORNEYS.

March 9, 1926. 1,576,043
R. B. FAGEOL
BUMPER
Filed May 31, 1923 2 Sheets-Sheet 2
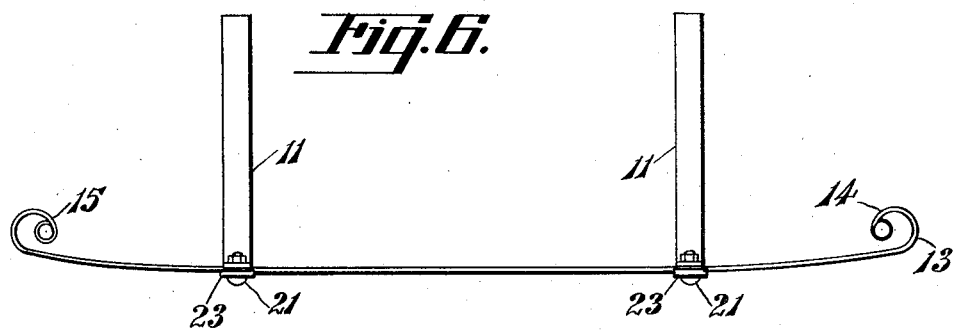
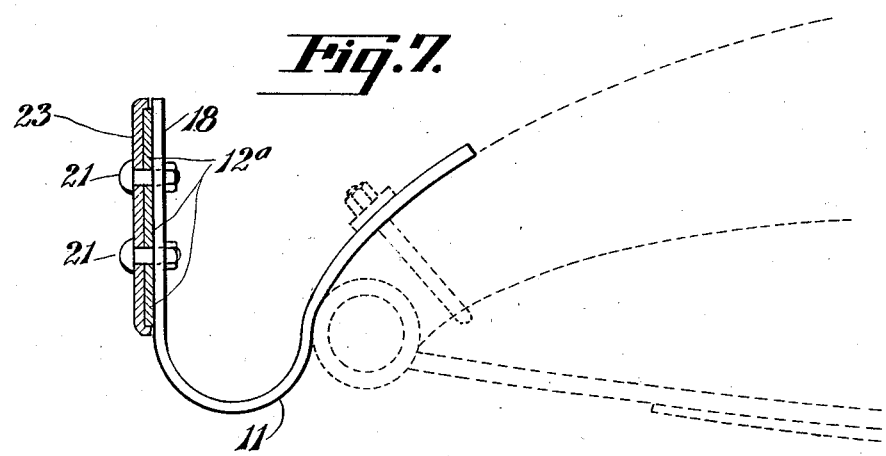
INVENTOR.
ROLLIE B. FAGEOL.
BY Dewey, Strong,
Townsend & Loftus.
ATTORNEYS.

Patented Mar. 9, 1926.

1,576,043

UNITED STATES PATENT OFFICE.

ROLLIE B. FAGEOL, OF OAKLAND, CALIFORNIA, ASSIGNOR TO AMERICAN CHAIN COMPANY, INC., OF BRIDGEPORT, CONNECTICUT, A CORPORATION OF NEW YORK.

BUMPER.

Application filed May 31, 1923. Serial No. 642,377.

*To all whom it may concern:*

Be it known that I, ROLLIE B. FAGEOL, a citizen of the United States, residing at Oakland, county of Alameda, and State of California, have invented new and useful Improvements in Bumpers, of which the following is a specification.

This invention relates to bumpers adapted to be maintained at the front or rear of automobiles for protecting the latter against damage resulting from collisions with other vehicles and stationary obstacles.

It is the principal object of the present invention to provide a generally improved resilient automobile bumper that will act effectively in absorbing impact with a minimum of damage to the bumper and to the vehicle upon which it is mounted, which bumper is inexpensive to manufacture, easily assembled on a vehicle regardless of the width thereof, and to present a relatively large impact area whereby it will effectively protect the end of a vehicle upon which it may be mounted from damage in the event of a collision with a stationary or moving object.

The invention contemplates the use of a plurality of resilient impact bars mounted in parallelism in the same vertical plane and connected to form a bumper structure of comparatively large impact area extending transversely of a vehicle frame, which structure is attached in an adjustable manner to mounting brackets that may be easily fitted to automobiles of varying frame widths.

The present invention is exemplified in the following description and illustrated by way of example in the accompanying drawings, in which:

Fig. 1 is a view in plan of a bumper embodying the invention and shown as attached to the front end of an automobile.

Fig. 2 is a front view of the bumper shown in preceding figure.

Fig. 3 is an enlarged transverse section view through the bumper taken on line 3—3 of Fig. 1, disclosing certain details of construction.

Fig. 4 is a fragmentary view in perspective of one of the ends of the bumper.

Fig. 5 is a view in front elevation of a slightly modified form of the invention illustrated in the preceding figures.

Fig. 6 is a plan of the same.

Fig. 7 is an enlarged sectional view taken on line 6—6 on Fig. 5.

Referring more particularly to the accompanying drawings, 10 indicates an automobile bumper here shown as mounted at the front of an automobile and connected to the frame thereof by a pair of mounting brackets 11.

The bumper proper comprises a plurality of flat resilient impact bars $12^a$ which are disposed parallel to each other and in the same vertical plane. The ends of the bars are curved as shown at 13 and are recurved as shown at 14 to form a "shepherd's crook", This formation of the ends of the bars has been found effective in eliminating entanglement of the bumper with objects in the path of the vehicle when backing.

Reference being had to Fig. 4 of the drawings, it is seen that the extremities of the bars at each end are curled as at 15 to form eyelets for the reception of bolts 16. Tubular spacing blocks are positioned between these curled ends and when the bolts are positioned and tightened up, the bars will be firmly connected and maintained parallel at spaced distances apart. This connection at the ends of the impact bars is effective in preventing distortion of the ends of the bumper from minor shocks.

The mounting brackets 11 may be of any suitable design but are preferably formed of flat resilient metal members bent to form a vertical portion 18 connected by a curved portion 19 to a substantially horizontal arm 20 which may be suitably connected to the vehicle frame. The vertical portion 18 is drilled to receive one or more bolts 21. As shown in Fig. 3, when the bumper is mounted on the brackets, a bolt extends between the impact bars at each end and a washer 22 is placed between the head of the bolt and the surface of the impact bars. When the bolts are tightened the bumper and brackets are firmly connected.

In Fig. 7 clamp plates 23 are substituted for the washers 22. The bolts extend through these plates and between the impact bars. The ends of the clamp plates 23 are bent to embrace the upper and lower bars. These ends, however, do not contact with the vertical portions 18 of the brackets and may be drawn into firm contact with the impact bars to prevent rattling.

It is obvious that the bumper may very easily be fitted to vehicles of any frame width as it is only necessary to loosen the bolts 21 and shift the brackets along the bumper to the desired position and then retighten the bolts.

The bumper here disclosed is described and shown as constructed of a plurality of impact bars arranged in the same plane to form a relatively large impact area. This is desirable for the reason that in some instances single bar bumpers on colliding vehicles will not be in the same horizontal plane and will therefore pass and cause damage to the front parts of each vehicle.

As the impact bars and brackets are formed of resilient material the bumper will act effectively in absorbing shocks and will not easily become distorted.

While I have shown the preferred embodiment of the invention, it is understood that various changes in the arrangement and design of the parts may be made by those skilled in the art, without departing from the spirit of the invention as defined in the appended claims.

Having thus described my invention, what I claim and desire to secure by Letters Patent is:—

1. An automobile bumper comprising a plurality of flat resilient impact bars arranged one above the other in substantially the same vertical plane at spaced distances apart and extending substantially across the face of the automobile, the extremities of two or more of said bars being curled to form eyelets, vertical members extending through said eyelets and connecting the ends of said bars and resilient flat strip supporting members for connecting the impact bars to the automobile frame.

2. An automobile bumper comprising a plurality of flat resilient impact bars arranged one above the other in substantially the same vertical plane at spaced distances apart and extending substantially across the face of the automobile, the extremities of two or more of said bars being curled to form eyelets, vertical members of circular cross section extending through said eyelets, and resilient flat strip supporting members for connecting the impact bars to the automobile frame.

3. An automobile bumper comprising a plurality of flat resilient impact bars arranged one above the other in substantially the same vertical plane at spaced distances apart and extending substantially across the face of the automobile, the extremities of two or more of said bars being curled to form eyelets, vertical members of circular cross section extending through said eyelets and curved resilient supporting members for connecting the impact bars to the automobile frame.

4. An automobile bumper comprising a plurality of flat resilient impact bars arranged one above the other in substantially the same vertical plane at spaced distances apart, and extending substantially across the face of the automobile, the ends of said bars being recurved, vertical members connecting the ends of said bars, supporting members for connecting the impact bars to the automobile frame, and connecting elements extending between said impact bars and engaging the impact bars and the supporting members for firmly connecting the impact bars to the supporting members.

5. An automobile bumper comprising a plurality of flat resilient impact bars arranged one above the other in substantially the same vertical plane at spaced distances apart and extending substantially across the face of the automobile, the ends of said bars being recurved, the extremities of said bars being curled to form eyelets, vertical members extending through said eyelets and connecting the ends of said bars, flat strip resilient supporting members for connecting the impact bars to the automobile frame, and connecting elements extending between said impact bars and engaging the impact bars and the supporting members for firmly connecting the impact bars to the supporting members.

6. An automobile bumper comprising a plurality of flat resilient impact bars arranged one above the other in substantially the same vertical plane at spaced distances apart, and extending substantially across the face of the automobile, the extremities of two or more of said bars being curled to form eyelets, vertical members extending through said eyelets and connecting the ends of said bars and supporting members having portions extending across the space between the impact bars for connecting the impact bars to the automobile frame.

7. An automobile bumper comprising a plurality of flat resilient impact bars arranged one above the other in substantially the same vertical plane at spaced distances apart, and extending substantially across the face of the automobile, the extremities of two or more of said bars being curled to form eyelets, vertical members of circular cross section extending through said eyelets and connecting the ends of said bars and supporting members having portions extending across the space between the impact bars for connecting the impact bars to the automobile frame.

8. An automobile bumper comprising a plurality of flat resilient impact bars arranged one above the other in substantially the same vertical plane, recurved spring loops at the ends of said bars providing rounded impact extremities and having free terminals, supporting means for said bumper having a vertically extending portion lying flat against the bumper strips, and means for clamping the bumper strips to said portions of the supporting members and in spaced relation to each other.

9. An automobile bumper comprising a plurality of flat resilient impact bars arranged one above the other in substantially the same vertical plane, recurved spring loops at the ends of said bars providing rounded impact extremities and having free terminals, supporting means for said bumper having a vertically extending portion lying flat against the bumper strips, means for clamping the bumper strips to said portions of the supporting members and in spaced relation to each other, and means vertically connecting the terminating ends of the bumper strips.

10. An automobile bumper comprising a plurality of flat impact bars superposed in substantially the same vertical plane and in spaced relation to each other, each bar terminating in a recurved loop end, the ends of the loops being free and formed with eyes, fastening means extending through the eyes of the loops at the opposite ends of the bumper, and a pair of brackets for supporting the bumper across the front of an automobile.

11. An automobile bumper comprising a plurality of flat impact bars superposed in substantially the same vertical plane and in spaced relation to each other, each bar terminatiing in a recurved loop end, the ends of the loops being free and formed with eyes, fastening means extending through the eyes of the loops at the opposite ends of the bumper, a pair of brackets for supporting the bumper across the front of an automobile, said brackets being disposed in parallel vertical planes and being formed with vertical portions lying transversely across the bumper bars, and means for clamping the bars to the brackets in spaced relation to each other.

12. An automobile bumper comprising a plurality of impact bars having superposed similar spring loops at their respective ends providing rounded double impact extremities and having free terminals.

13. An automobile bumper comprising a plurality of flat resilient impact bars disposed in spaced relation to each other and in substantially the same vertical plane, the ends of said bars being free and recurved to form resilient loops at the opposite ends of the bumper structure, a pair of supporting members formed of flat resilient metal for securing the bumper across the frame of an automobile, the forward portions of said resilient supporting members lying flat across the backs of the resilient bars and extending vertically, and means for securing the bumper bars against said vertically extending portions of the supporting brackets.

14. An automobile bumper comprising a plurality of flat resilient impact bars disposed in spaced relation to each other and in substantially the same vertical plane, the ends of said bars being free and recurved to form resilient loops at the opposite ends of the bumper structure, a pair of supporting members formed of flat resilient metal for securing the bumper across the frame of an automobile, the forward portions of said resilient supporting members lying flat across the backs of the resilient bars and extending vertically, means for securing the bumper bars against said vertically extending portions of the supporting brackets, and means for tying the terminating ends of the loops together.

15. An automobile bumper comprising a plurality of flat resilient impact bars disposed in spaced relation to each other and in substantially the same vertical plane, the ends of said bars being free and recurved to form resilient loops at the opposite ends of the bumper structure, and supporting brackets for securing the bumper across the front of an automobile, each being formed of flat resilient metal, the width of the section of which metal lies horizontally, and which metal is formed with spring loops, one of the faces of the loops on each bracket extending vertically and transversely of the bumper bars, and means for securing said bars to said portions of the brackets and in spaced relation to each other.

16. An automobile bumper comprising a plurality of parallel bumper bars said bars terminating at their ends in eyes, means passing through the eyes for connecting said bars, means for spacing the bars vertically and supporting means intermediate the ends of the bumper bars for mounting said bumper structure transversely of the end of an automobile.

17. An automobile bumper comprising a plurality of parallel and vertically spaced impact bars, said bars having vertical eyes in their terminating ends, connecting bolts one of which passes through the eyes at one end of the bars and another passing through the eyes at the opposite end of the bars, clamping means intermediate the ends of the bars for holding them parallel and means connecting with the clamping means for mounting the bumper on the vehicle.

18. An automobile bumper comprising a plurality of parallel and vertically spaced impact bars said bars each having recurved ends terminating in vertical eyes, connecting bolts passing through the eyes and opposite ends of the bars, clamping means intermediate the ends of the bars for rigidly holding the bars in spaced parallel relation to each other and means connected with the clamping members for mounting the bumper on a vehicle.

19. An automobile bumper comprising a plurality of flat resilient impact bars arranged one above the other in substantially the same vertical plane at spaced distances apart, and extending substantially across the face of the automoblie, vertical members connecting the ends of said bars, supporting members for connecting the impact bars to the automobile frame, and connecting elements extending between said impact bars and engaging the impact bars and the supporting members for firmly connecting the impact bars to the supporting members.

ROLLIE B. FAGEOL.